United States Patent

Guess et al.

[11] Patent Number: 5,976,383
[45] Date of Patent: *Nov. 2, 1999

[54] RECYCLE PROCESS FOR REMOVING DISSOLVED HEAVY METALS FROM WATER WITH ALUMINUM PARTICLES

[75] Inventors: Robert G Guess, Danvers, Mass.; Stephen E. Lavalley, East Hampstead, N.H.

[73] Assignee: Romar Technologies, Inc., Topsfield, Mass.

[ * ] Notice: This patent is subject to a terminal disclaimer.

[21] Appl. No.: 08/700,688

[22] Filed: Aug. 12, 1996

Related U.S. Application Data

[63] Continuation-in-part of application No. 08/386,700, Feb. 10, 1995, Pat. No. 5,545,331, which is a continuation-in-part of application No. 08/218,733, Mar. 28, 1994, Pat. No. 5,389,262, which is a continuation-in-part of application No. 07/893,978, Jun. 3, 1992, Pat. No. 5,298,168, which is a continuation-in-part of application No. 07/682,129, Apr. 8, 1991, Pat. No. 5,122,279.

[51] Int. Cl.$^6$ .................................. C02F 1/62; C02F 1/70
[52] U.S. Cl. .................... 210/711; 210/712; 210/713; 210/719; 210/722; 210/912; 210/913; 210/914
[58] Field of Search ............................ 210/719, 713, 210/711, 912, 712, 722, 913, 914

[56] References Cited

U.S. PATENT DOCUMENTS

| | | |
|---|---|---|
| 1,479,542 | 1/1924 | Hirschikind . |
| 3,216,790 | 11/1965 | Murib . |
| 3,226,185 | 12/1965 | Gyan et al. . |
| 3,260,593 | 7/1966 | Zimmerley et al. . |
| 3,634,071 | 1/1972 | Spedden et al. . |
| 3,770,630 | 11/1973 | Kamperman . |
| 3,902,896 | 9/1975 | Borbely et al. . |
| 4,076,795 | 2/1978 | Tiethof . |
| 4,157,980 | 6/1979 | Tiethof . |
| 4,405,464 | 9/1983 | Baldwin et al. . |
| 4,566,975 | 1/1986 | Allgulin . |
| 4,599,177 | 7/1986 | Hayashi et al. . |
| 4,606,829 | 8/1986 | Rice et al. . |
| 4,698,162 | 10/1987 | Guilbault et al. . |
| 4,859,447 | 8/1989 | Sanglet . |
| 4,956,097 | 9/1990 | Courduvelis . |
| 5,011,610 | 4/1991 | Martin et al. . |
| 5,019,273 | 5/1991 | Fehsenfeld . |
| 5,039,428 | 8/1991 | Wentzler et al. . |
| 5,085,836 | 2/1992 | Booker . |
| 5,102,556 | 4/1992 | Wong . |
| 5,122,279 | 6/1992 | Guess . |
| 5,133,873 | 7/1992 | Catlin et al. . |
| 5,298,168 | 3/1994 | Guess . |
| 5,389,262 | 2/1995 | Guess . |
| 5,545,331 | 8/1996 | Guess . |

FOREIGN PATENT DOCUMENTS

| | | |
|---|---|---|
| 1350703 | 4/1974 | United Kingdom . |
| 2125828 | 3/1984 | United Kingdom . |

*Primary Examiner*—Neil McCarthy
*Attorney, Agent, or Firm*—Paul J. Cook

[57] ABSTRACT

Aluminum particles are reacted with heavy metal ions in a first acidic aqueous solution to form heavy metallic particles that are suitable for recycling and reuse when recovered from the first aqueous solution. The first residual aqueous solution may also contains ferrous ions obtained by acid redissolving a co-precipitated heavy metal hydroxide and ferrous hydroxide sludge that is produced in the treatment of a dilute chelated heavy metal solution. The first residual aqueous solution with heavy metals substantially removed is recycled and reused as the ferrous reagent for treating said dilute chelated heavy metal bearing solution. The process disclosed herein is useful for treating both dilute and concentrated wastes and wastewaters generated by industries such as metal plating and metal etching and printed circuit board fabrication.

48 Claims, 1 Drawing Sheet

RECYCLE PROCESS FOR REMOVING DISSOLVED HEAVY METALS FROM WATER WITH ALUMINUM PARTICLES

This application is a continuation-in-part of application Ser. No. 08/386,700, filed Feb. 10, 1995 now U.S. Pat. No. 5,545,331 which, in turn, is a continuation-in-part of application Ser. No. 08/218,733, filed Mar. 28, 1994, now U.S. Pat. No. 5,389,262 which, in turn, is a continuation-in-part of application Ser. No. 07/893,978, filed Jun. 3, 1992, now U.S. Pat. No. 5,298,168, which, in turn, is a continuation-in-part of application Ser. No. 682,129, filed Apr. 8, 1991, now U.S. Pat. No. 5,122,279.

BACKGROUND OF THE INVENTION

This invention comprises a process that utilizes aluminum particles in conjunction with other materials for effectively and completely removing and reclaiming environmentally toxic heavy metals from aqueous solutions. More particularly, this invention relates to such a process wherein heavy metals are effectively removed from chelated solutions as insoluble metal hydroxide sludge which is recycled to another step and reclaimed as heavy metallic particles, and a useful concentrated solution of ferrous ions is produced that is recycled to another step and used as an effective reagent for treating the chelated waste water. And, wherein the metal hydroxide sludge is recycled and consumed within said process, production of F006 hazardous waste sludge is substantially reduced or eliminated. An alkaline aqueous effluent containing some dissolved aluminum but having an exceptionally low residual concentration of dissolved toxic heavy metals is produced, which shall compy with most regulatory discharge limits. The present invention is useful for treating heavy metal ion containing aqueous wastes and waste water generated by industries such as metal plating, metal surface finishing or printed circuit board manufacturing.

Prior to the present invention, it has been generally accepted that plating waste metals removed from alkaline solutions as metal hydroxide sludges must be handled as hazardous waste. Environmental Protection Agency (EPA) jurisdiction over these wastes is well established. When generated by an electroplating facility and shipped off site, such sludge materials are defined as categorical F006 hazardous waste. Transporting and receiving and processing of these materials even for reclamation and recycling, are restricted to EPA or State licensed operators. Due partly to this, and also due in part to the low metal concentration in such sludges, high recycling costs are incurred that usually exceed the recoverable value of the metals.

Metals such as iron and aluminum have long been known to react directly with certain other metals that are dissolved in acidic aqueous solution. When aluminum dissolves into an acidic solution containing certain dissolved metals, the other dissolved metal deposits a metallic layer on the surface of the aluminum. Referred to as metallic replacement or cementation, this characteristic of metals has commonly been used in the commercial extraction of copper from ores and acid leaching of mine tailings.

U.S. Pat. No. 4,082,546 issued Apr. 4, 1978 to Wallace discloses a novel method for using finely divided mechanically worked strips of aluminum foil or gauze or chaff coated in a thin imperfect oxide layer of usually less than 500 angstroms thick in a process for removing heavy metals from spent plating, stripping, and dragout baths. The choice of the form of the aluminum is said to be important to the performance of the invention. Wallace reveals that 1.0N sodium hydroxide is used to elevate solution pH values to about 11 before contacting the solutions with the metallic aluminum material. This method is inconvenient and costly when dealing with concentrated acid waste solutions due to high amounts of exothermic heat being generated and the costly consumption of sodium hydroxide. The methods disclosed here also requires the use of coarse mechanically worked aluminum which is a very costly form of fabricated raw material.

U.S. Pat. No. 4,450,002 issued to Durkee on May 22, 1984 reveals a method for using a complicated array of flow chambers for contacting metallic aluminum with an acidic heavy metal solution. Specific flowing velocities are prescribed as being necessary to entrain and carry away the cementation produced metallic copper to a part of the apparatus where it is separated by filtration from the flowing solution. A very costly custom designed and fabricated apparatus would be needed in order to practice the method disclosed here. There is no description of how any metal hydroxides are formed and no reference given as to the recycling of any materials within the disclosed process.

U.S. Pat. No. 4,950,326 issued to Holly on Aug. 21, 1990 reveals another application of alkaline aluminum metal cementation for the specific treatment of spent electroless copper baths after the reducing agent (normally formaldehyde) is first deactivated by a treatment with hydrogen peroxide. Finely divided aluminum particles, preferrably smaller than about 60–100 microns are speficied for this use. A final dissolved copper concentration of less than 1 ppm is described. Although many detailed notions are revealed, no examples are provided. A major limitation of the domain covered in this disclosure is its application only to one specific waste solution as noted. There is no reference to metal hydroxides being generated or recycled and nothing pertaining to the use of ferrous ions is revealed here.

U.K. Patent Application GB 125828 A, filed Jun. 16, 1983 discloses a process for removing copper ion from solution by contacting the solution with steel wool, converting only a small portion of the iron into copper. This process is commercially undesirable due to 1) the uneconomically low conversion of iron to copper, and 2) the high cost of steel wool and 3) the high labor cost for handling the materials. The recovered copper has a lower recycling value due to the cost of processing required for separating it from the residual steel wool fibers.

Many other methods exist for removing heavy metal ions from aqueous solutions, and which are commonly practiced in the pretreatment of industrial waste-waters containing environmentally toxic metals. When dissolved heavy metal solutions are free of chelating agents, they can be effectively treated by simply admixing an alkaline or caustic compound to precipitate the insoluble metal hydroxide. Sodium hydroxide, soda ash, lime or magnesium hydroxide slurry are all used to do this. Unfortunately, such processes generate large volumes of metal hydroxide sludge which must be disposed of or recycled by a very costly and highly regulated method.

Frequently, however, complexing ammonium ions of chelating compounds such as the sodium salts of etheylenediaminetetra-acetic acid (E.D.T.A.) and others having similar properties are present. They occur as ingredients in the used plating baths, cleaners and brighteners drained into the waste-water. In such cases, it is necessary either; 1) to use a strong chemical that breaks the chelant-to-heavy metal bond and forms a stable, insoluble compound or complex of the toxic metals, or 2) to add a substance that exerts a stronger attraction for the chelant than does the toxic metal ion, to free the heavy metal to precipitate as an insoluble hydroxide. Processes of both types are currently practiced.

Sodium sulfide is used to effectively precipitate heavy metals. Its sole advantage is the extremely low solubility of most heavy metal sulfides. Most are capable of existing in the presence of even the strongest chelating agents. Undesirable aspects of using a sulfide process include the extreme toxicity of hydrogen sulfide gas which can be generated by contacting the sulfides with strong acids. Also, metal sulfide precipitates are slimy and difficult to filter. Large quantities of flocculants and filter aids are used, generating large volumes of sludge and corresponding high disposal costs.

Sodium borohydride is a strong, water soluble reducing agent that has an advantage of producing a compact semi-metallic sludge. There are several reasons for its not having broad acceptance for heavy metal removal in waste-water treatment: 1) it is very expensive, 2) precipitated metals easily reoxidize and redissolve in the presence of dissolved ammonia, 3) dangerous concentrations of potentially explosive hydrogen gas can accumulate in the space above a reaction using sodium borohydride, and 4) at times when pH is not controlled perfectly, reactions occurring at an elevated pH of 8 or higher give off toxic fumes of hydrogen sulfide gas, dangerous to workers and sensitive equipment.

Hydrazine is another strong reducing chemical capable of breaking a metal ion bond to chelants. It is used to a limited extent for heavy metal removal, but like borohydride, it too is very expensive to use and it too can generate dangerous volumes of hydrogen gas when acidified. Hydrazine has also been placed on a list of chemicals suspected of being carcinogenic. This has been a major impediment to its industrial use.

Several compounds have been used that form insoluble metal complexes with heavy metal ions. All exert a stronger attraction to the metal ion than the chelants normally occurring with the metals in the waste-waters. Insoluble starch xanthate is one such material, reportedly effective at complete removal of dissolved metal from the water. Its drawback is its generation of huge volumes of sludge, which retains a high water content and costs the user a severe penalty for disposing of same as a hazardous waste.

Other such complexing agents have gained widespread use including sodium dimethyldithiocarbamate (D.T.C.), and sodium diethyidithiocarbamate (D.E.T.C.). These are fairly effective at completely removing some heavy metal ions from a chelated solution but are found to be ineffective for treating waste water containing E.D.T.A. complexed lead ions. Further, D.T.C. products require costly reclaiming methods in order to recycle the recovered heavy metal. The precipitate is low density and difficult to gravity settle. The sludge often floats on water and requires using coagulent compounds to increase sludge density so it will settle, thereby multiplying the amount of hazardous waste sludge produced. In addition, the dithiocarbamate compounds exhibit acute biological toxicity toward aquatic plant and animal species. Sodium dimethylidithiocarbamate is used as the active ingredient in several EPA registered pesticide products.

At the present time, strict biological toxicity standards are being enforced upon industries by municipal sewerage authorities. Effluent toxicity is measured by placing live specimens of plant and animal species in diluted samples of such treated waste-waters. Recent data indicate that interactions exist between very low concentrations of certain heavy metals such as copper and silver, and certain anions such as nitrate, which produce more toxicity than is attributable to each component by itself. The implication of these developments is that even lower levels of removal of heavy metal ions from industrial effluents is required. A costly evaluation of background toxicity factors is required when an industry's effluent fails to meet specific toxicity limits.

The conventional waste-water treatment process, perhaps most frequently used by the largest number of industries, uses ferrous sulfate heptahydrate powder. Ferrous ion is substituted at a controlled acidic pH of about 2 to 3, to replace toxic heavy metal ions that are bonded by chelating agents. This allows the heavy metal ions to be rendered insoluble as hydroxides which are precipitated from an alkaline solution.

In the presence of strong chelants or free ammonia dissolved in alkaline solutions, a large excess of this source of ferrous ion is required. Normally, 5 to 10 ferrous ions are added for each copper ion being removed from chelated waste-waters. In heavily chelated streams, as many as 25 to 30 ferrous ions per heavy metal ion may be required in order to prevent the chelants from dissolving the heavy metal hydroxide. Commercial ferrous sulfate has seven waters of hydration and is only about 20% iron by weight. In some cases, over 100 pounds of ferrous sulfate powder is added to the waste water for each pound of chelated or ammoniated copper removed, thereby generating 60 to 80 pounds of sludge.

In typical treatment systems, each additional pound of iron used adds about 4 pounds to the weight of sludge made. This can be reduced to about 3 pounds of dry sludge per pound of iron if a sludge dryer is used. When ferrous sulfate is dissolved into waste water, it causes acidity in the water. Each mole of iron introduced this way requires using two moles of sodium hydroxide to neutralize the acidity and form ferrous hydroxide. Therefore, when large excess amounts of ferrous sulfate heptahydrate powder are used, the total chemical cost for treatment is compounded. Higher hazardous waste sludge disposal costs are also incurred.

It has been proposed in U.S. Pat. No. 5,102,556 to recycle ferric hydroxide sludge which may contain occluded heavy metals in order to produce iron chloride. The iron chloride is utilized in a process known as Unipure process described in U.S. application Ser. No. 042,565 filed Apr. 16, 1987 and U.S. application Ser. No. 07/359,872 filed May 1, 1989. In this process, an aqueous solution of heavy metals and a ferrous component, e.g., ferrous chloride is rapidly oxidized, usually by air injection to produce a sludge containing the heavy metals and ferric or oxyferric hydroxide. This sludge is recycled to produce the ferrous chloride in a two step procedure. In the first step the sludge is reacted with hydrochloric acid to produce dissolved ferric chloride. In the second step, the ferric chloride is reacted with iron, usually in the form of iron powder to produce the ferrous chloride. Intermediate filtration steps can be utilized to remove undissolved species such as unreacted iron, metal chlorides or hematite. This process is inefficient and undesirable since valuable reducing capacity of metallic iron is consumed in converting ferric iron to ferrous iron, rather than being consumed to reduce dissolved heavy metal ions to heavy metals precipitate that can be easily recovered. In addition, the use of an oxidation step on the heavy metal solution containing iron limits its utility for treatments of solutions containing chelated heavy metals since the presence of a strong oxidation potential enhances the attraction of the chelating agents for the heavy metals and decreases the bonding attractions between the chelating agents and the dissolved iron. As a result the tendency of the heavy metals to remain dissolved is increased. To overcome the disadvantage, the Unipure process is required to use excessively high ratios of iron to heavy metal in the water treatment process that employs such oxidation of the iron. This results in an increased consumption of iron and a net increase of the amount of process sludge produced. Typically an increase of 1 part by weight of net metallic iron results in a net increased production of about 5 to 10 parts by weight of iron bearing wet sludge.

U.S. Pat. No. 5,039,428 discloses a process for removing heavy metals from water by effecting precipitation on the surface of particles having alkaline surface activity and to produce a waste water stream. Alkaline reagent is added to a portion of the waste water to render the particle surfaces alkaline active. The activated particles then are recycled to the precipitation step. A second portion of waste water from the precipitation step is filtered to produce sludge and water, free of particles and sludge. This process does not involve a reducing step to form heavy metal particles.

It would be highly desirable to provide a safe, simple, reliable and economical process for removing heavy metals from aqueous solutions that would:

1) yield a superior quality aqueous effluent that is low in biological toxicity and compliant with all regulations for discharging into a public sewer or waterway, and, 2) eliminate producing an F006 hazardous waste sludge that is normally generated at an alkaline pH and usually has a lower metal content, and 3) reclaim the metals in a concentrated metallic form that yields a net positive value when recycled, and, 4) use readily available and economic materials that are non-hazardous and do not cause irritating or foul odors or explosive gases.

SUMMARY OF THE INVENTION

The process of this invention comprises three distinct steps which produce solid heavy metal particles which are recovered, slurries which are recycled within the process and a non-toxic effluent.

The present invention provides a method for reclaiming the heavy metals contained in a ferrous-rich heavy metal hydroxide sludge, such as that produced by treating a dilute aqueous solution of chelated heavy metals with ferrous ions. When admixed with a concentrated mineral acid, said metal hydroxide sludge redissolves and produces an acidic solution with a high concentration of dissolved ferrous ions and heavy metal ions. Aluminum particles are used to reduce said heavy metal ions to metallic heavy metal particles suspended in an acidic solution of concentrated ferrous ions. Metallic particles of heavy metals are separated from said acidic ferrous solution by conventional methods, reclaimed and recycled to recover heavy metal values. Said remaining concentrated ferrous solution is recycled and used to treat more of said dilute aqueous solution of chelated heavy metals. By recycling the ferrous hydroxide containing sludge within this process, a plentiful amount of inexpensive ferrous ions is regenerated and made available for treating chelated heavy metal ions in a dilute aqueous solution.

Recycling of ferrous ions contained in a ferrous-rich heavy metal hydroxide sludge that is produced by the treatment of a dilute aqueous solution of chelated heavy metals, to admixture with a concentrated acid solution, such as a concentrated heavy metal bearing waste acid solution, followed by subsequent admixture with metallic aluminum particles results in the precipitation of solid metallic heavy metal particles suspended in an acidic solution of concentrated ferrous ions. Upon removing the heavy metal particles from said acidic ferrous solution, said ferrous solution is added to more of said dilute chelated heavy metal aqueous solution to provide the needed ferrous ions for freeing the heavy metal ions from being bound to the chelant.

In accordance with a first step of the present invention, aluminum particles are reacted with concentrated heavy metal ions in acidic water at a pH between about 0.1 and 4, preferably between about 1 and 2 in a novel process which includes a recycle step. Heavy metals are provided from redissolved heavy metal hydroxide sludge recycled to the first step from a third step described below. Heavy metal ions can also be provided in the concentrated acid aqueous solution used for dissolving the heavy metal hydroxide sludge. Ferrous ion is provided from recycled and redissolved ferrous hydroxide also contained in said sludge from the third step. The aluminum particles dissolve and reduce the heavy metals ions to zero valence. The reducible heavy metals form metallic particles that are suitable for economical recycling and reuse. The heavy metallic particles are recovered by conventional gravity settling or filtering from the acidic solution.

The acidic supernatant liquid from the first step contains dissolved ferrous ions and aluminum ions. It is useful in this process for treating dilute solutions of chelated heavy metals such as process rinse waters. When the residual liquid of the first step is admixed with a dilute acidic solution of chelated heavy metals, the second chemical reaction step of this process occurs, which is the displacing of chelant bonds from equilibrium attractions to heavy metal ions to stronger attractions toward the more plentiful ferrous ions in said dilute solution.

The liquid effluent from the second step is directed to the third step, and the dilute solution is neutralized to an alkaline pH, between about 7 and 12, preferably between about 9 and 11, by adding a suitable caustic alkaline compound. At a pH between about 7 and 12, heavy metal hydroxides co-precipitate with ferrous hydroxide from the solution as a dense, fast settling mixture, and leave a substantial quantity of soluble aluminum to remain in solution as hydrated alkaline aluminate ions. By controlling the pH of this third step reaction at a sufficiently high level, such as between 10 and 12, the amount of aluminum left dissolved in the effluent will approximately equal the amount added as aluminum particles in the first step, thereby greatly reducing the production of excess metal hydroxide sludge.

Said settled metal hydroxide slurry is found to be further useful in this process for neutralizing the strong acidity contained in some of the concentrated metal plating and etching and regenerant solutions being reclaimed in the first step of this process. The metal hydroxides are an effective substitute for purchased new caustic.

The heavy metal content in the hydroxide slurry of the third step is effectively concentrated at a higher concentration than occurring in the dilute solution, which provides for a more efficient performance of the reduction in the first step that forms metallic particles of the heavy metal. The slurry produced in the third step can be recycled to the first step, the second step and/or the third step. A portion of the slurry can be withdrawn from the process for disposal, if necessary in order to control the aluminum inventory within the process.

The resulting liquid effluent is extremely low in heavy metal ion concentrations, generally below detection levels of atomic absorption spectrophotometry. When no precipitated alkaline heavy metal hydroxide or ferrous hydroxide or any mixture thereof are withdrawn and disposed of, then it can be fairly stated that this process totally eliminates the generation of such regulated alkaline metal hydroxide, F006 sludges. The process of this invention provides substantial advantages over prior art processes. The aqueous effluent has low or no biological toxicity and very low or no heavy metal content. Hazardous sludge is substantially reduced or eliminated. Reusable valuable heavy metal is recovered. In addition and primarily by virtue of the recycling of materials within the process, the present invention provides more efficient use of raw materials and provides reduced overall operating costs.

The process of this invention reclaims heavy metals from both concentrated and dilute aqueous acidic solutions as metallic particles. Heavy metals are first removed from the dilute heavy metal solutions as heavy metal hydroxides. These heavy metal hydroxides are recycled and redissolved in concentrated acid solutions which may also contain dissolved heavy metals, such as spent plating or etching baths. Aluminum particles are admixed and react with the acid redissolved heavy metals from the metal hydroxides and acid solutions, producing reduced metallic particles of said heavy metals that are suitable for reclaiming and recycling for metal values.

A superior quality treated waste-water is produced that is low in biological toxicity and meets the strictest EPA and State environmental standards for discharge of liquid effluent to a public sewer. This new improved process provides a method for closed-loop recycling of materials that are presently disposed of as hazardous waste. This process also provides the means for minimizing and balancing chemical raw materials usage by a novel method that can totally eliminate generating any regulated F006 hazardous waste sludge.

BRIEF DESCRIPTION OF THE DRAWINGS

The FIG. 1 is a schematic diagram illustrating the process of this invention.

DESCRIPTION OF SPECIFIC EMBODIMENTS

Figure 1:
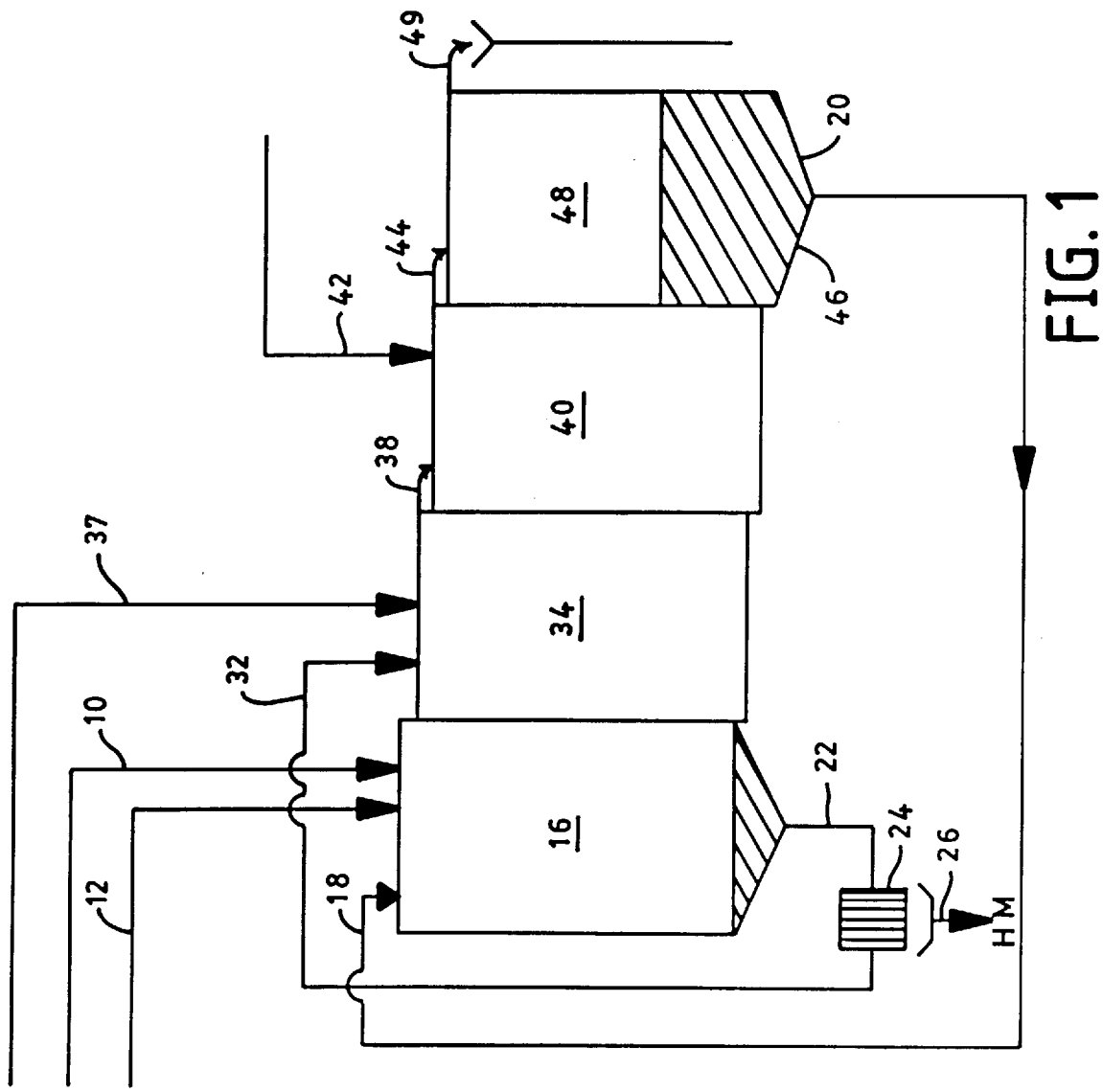

In accordance with one embodiment of this invention and in a first step, an aqueous alkaline slurry of heavy metal hydroxide solids and ferrous hydroxide solids, which was produced from treating a dilute aqueous chelated heavy metal solution with a ferrous ion containing reagent, is redissolved in a concentrated mineral acid solution that may also contain dissolved heavy metal ions, resulting in an acidic solution of heavy metal ions and ferrous ions at a pH of between about 0.1 and 4, but preferably between about 1 and 2.

Said metal hydroxide solids react with the acid and dissolve in the solution in accordance with Equations 1 and 2 wherein HM denotes heavy metal.

$$HM(OH)_2 + 2(H^+) \rightarrow (HM^{++}) + 2H_2O \qquad \text{Equation 1}$$

$$Fe(OH)_2 + 2(H^+) \rightarrow (Fe^{++}) + 2H_2O \qquad \text{Equation 2}$$

In accordance with a preferred method of this invention, aluminum particles are utilized in this first step to reduce and precipitate said dissolved heavy metals from said concentrated aqueous acidic solutions as produced in Equations 1. The metallic aluminum dissolves and reduces the heavy metal ions to form heavy metal particles in accordance with Equation 3.

$$2Al + 3(HM^{++}) \rightarrow 3HM + (Al^{+++}) \qquad \text{Equation 3}$$

The reaction defined by Equation 3 is effected at a pH between about 0.1 and 4, preferably between about 1 and 2.

The metallic particles of heavy metals produced by Equation 3 are heavy and fast settling and can be reclaimed by conventional settling and/or filtration. Due to its high heavy metal content, such reclaimed material is valuable for recycling to a heavy metals refinery or smelter.

After removing the heavy metal particles produced in Equation 3, the acidic aqueous effluent from this first step contains the dissolved ferrous ions produced by Equation 2. Said ferrous ions are valuable for recycling as the preferred reagent for treating a dilute aqueous chelated heavy metal solution. When admixed with an acidic solution of chelated heavy metal ions having a pH between about 1 and 5, the ferrous ions preferrentially surround and bond to the chelating agent anions, [CA=], displacing the heavy metal cations which were previously bonded by equilibrium attractions to the chelant anions. This reaction is defined by Equation 4.

$$(Fe^{++}) + [CA=] \times [(HM^{++})] \rightarrow (HM^{++}) + [CA=] \times [Fe^{++}] \qquad \text{(Equation 4)}$$

A generous molar excess of ferrous ions is normally required in order to drive the equilibrium of Equation 4 to the right and to free the heavy metal cations from the solubilizing influence of the chelant ionic attractions. This is evident in the ratio of ferrous ion to heavy metal ion concentrations found to be useful for this purpose, which are usually in a range of about 4 to 20 parts ferrous per part heavy metal in the acidic solution being successfully treated.

One skilled in the art can easily appreciate the economic benefits for using the methods of this invention which provide for regenerating and reusing the ferrous ions instead of purchasing and adding fresh ferrous ions to supply the needed demand for this use. Additional economy is realized by not filter pressing the ferrous hydroxide sludge and shipping it all off-site for regulated disposal at considerable additional expense.

The present invention permits the use of a reactor vessel of suitable design for the first step reaction which allows the finely divided heavy metal particles to settle from the supernatent liquid. By gravity settling, a thick dense slurry of the heavy metals can be recovered. Filtering this slurry and rinsing and drying the recovered solids produces a concentrated, highly metallic form of material, suitable for recycling and reuse of the metals in other processes.

In accordance with the process of this invention, aluminum particles are utilized to reduce heavy metal ions to metallic particles of said heavy metals. By the term "heavy metal" as used herein, is meant a metal having:

1) an atomic weight heavier than calcium, that is greater than 40.08, and
2) its compounds exhibit biological toxicity when released into the environment. Representative heavy metals include copper, zinc, nickel, tin, lead, cadmium, cobalt, mercury, chromium, zinc, manganese, silver, gold, platinum, palladium, vanadium, arsenic, antimony, bismuth, indium, rhodium, ruthenium, technetium, molybdenum, niobium, osmium, iridium, uranium, plutonium, lanthanides, actinides and mixtures thereof.

While the size of the aluminum particles is not critical to the present invention, faster reactions are obtained with smaller particles of aluminum. More finely divided particles provide a greater surface area. Since this heterogeneous reaction between aluminum and heavy metal ions occurs on the surfaces of the aluminum particles, the greater the area of exposed surface, the faster the rate of reaction that occurs. Thus, the particles typically have a size smaller than about +10 mesh, preferably less than about +100 mesh, and most preferably, less than about +200 mesh.

Upon removing the reclaimed metallic particles from the liquid of the first step, the residual acidic liquor contains dissolved ferrous and aluminum ions. This residual solution is found to be highly useful as an effective reagent for supplying ferrous for the removal of heavy metals from dilute chelated heavy metal solutions, such as chelated metal process rinse waters, in a second stage reaction. Such dilute solutions typically have dissolved heavy metals in a concentration of between about 10 and 100 milligrams per liter.

The residual liquid from the first reaction step is added as reagent into a second step where reaction occurs in a dilute acid aqueous solution of chelated heavy metals. In the second step reaction, chelated heavy metal ions react in accordance with Equation 4, with ferrous ions at a pH between about 1 and 5, preferably at a pH between about 2 and 4. The heavy metal ions remain dissolved in the acidic solution. Virtually all of the heavy metal ions complexed previously by chelant anions that may be present dissociate from the chelant ions and become free heavy metal cations. The ferrous ions enhance the breaking of chelant attractions to heavy metal ions. The chelant anion attractions are preferentially transferred to dissolved ferrous ions, which are being recycled and reused. The entire contents of this second step product are transferred to the third step.

The third step reaction occurs with caustic soda or soda ash or an alkaline compound such as magnesium hydroxide or lime or the like added to neutralize the acidity and raise the pH of the solution to between about 7 and 12, preferably between about 9 and 11. This causes all of the heavy metal ions to precipitate as an unusually dense and fast settling solids material. The solids are precipitated as a slurry which is a mixture of ferrous hydroxide and heavy metal hydroxides.

The reactions occurring in the third step of this process proceed according to Equations 5, 6, and 7 as in the following:

$$(Fe^{++}) + 2(OH^-) \rightarrow Fe(OH)_2 \quad \text{Equation 5}$$

$$(HM^{++}) + 2(OH^-) \rightarrow HM(OH)_2 \quad \text{Equation 6}$$

$$(Al^{+++}) + 4(OH^-) \rightarrow [Al(OH)_4]^- \quad \text{Equation 7}$$

As free metal cations, both ferrous and heavy metal ions form insoluble hydroxide precipitated solids at alkaline pH as heavy, dense, fast settling material. The acidic aluminum cations are converted to alkaline aluminate anions according to Equation 7 which are increasingly soluble in an aqueous solution as the pH is raised above about 9. Therefore, by adjusting the final alkaline pH to a value higher than 9, for example, 10 to 11, most or all of the aluminum present can be made soluble and be discharged in the final effluent.

The solids slurry of the third reaction step is withdrawn from the bottom of the settling vessel utilized and is recycled to the first, second and/or third reaction step(s) of the process of this invention. The heavy metal hydroxides dissolve in the concentrated heavy metal acidic solutions of the first step, contributing an alkali value to the neutralization of the strong acid solutions in accordance with Equation 1 shown above. The ferrous hydroxide dissolves accordingly, forming ferrous ions in the concentrated reaction solution of the first reaction step in accordance with Equation 2, shown above.

Additional acid can be added to effect complete sludge solubilization if desired. The heavy metal content of the hydroxide slurry is about 50 to 250 or more times as concentrated as the heavy metal content in the dilute chelated heavy metal solution feeding to the second reaction step. When the slurry is further settled and/or de-watered, even higher ratios are obtained and the volume of the recycle is lowered.

Thus, a closed-loop method is disclosed for recycling and reusing the gravity settled slurries of ferrous hydroxide and heavy metal hydroxides produced in the alkaline third step of the process of this invention. The slurries can be recycled to the first, second and/or third steps of this process and mixed with acidic metal solutions which are partially neutralized by the alkalinity of the hydroxides, saving the cost of purchasing new caustic alkali material.

The heavy metal hydroxides and ferrous hydroxide are dissolved into acidic solution with the concentrated metals. The heavy metals are reclaimed as metallic particles by the reaction of the first step of this process. Recycling of the ferrous containing hydroxide sludge substantially decreases the amount of fresh new ferrous containing reagent needed for treating the dilute chelated heavy metal bearing waste water solution. This decreases the raw material cost of waste water treatment and minimizes net production and disposal of metal hydroxide sludge.

When treating a dilute acidic solution containing chelated heavy metal ions, the final liquid effluent produced contains lower concentrations of heavy metals when the conversion of ferrous ion to ferric ion is minimized. In one aspect of this invention, a mild reducing agent, other than aluminum, such as sulfur dioxide, bisulfite ion or sulfite ion or mixtures thereof is added to the dilute acidic waste water to reduce residual oxidizers that may be contained in the raw waste water. Such oxidizers as hydrogen peroxide, sodium persulfate or hypochlorites frequently originate in the reagents used for etching metals. Alternatively, any of these aforementioned reducing agents can be comixed into the acidic solution containing ferrous ions that is produced after solid heavy metal particles have been recovered in the first step of this process to provide a means for introducing the reducing agent into the dilute acidic waste water to be further treated in accordance with this invention.

Referring to the FIG. 1 a stream of concentrated aqueous mineral acid that may also contain dissolved heavy metals 10, and a recycled slurry containing ferrous hydroxide 18, which can also contain heavy metal hydroxides, from a downstream step 20, are introduced into a first step container 16. Aluminum particles 12, are also introduced into the first step container 16. Reclaimed heavy metal is removed through stream 22 and recovered through stream 26 by a filter 24 or the like. The liquid effluent 32 from reactor 16 is introduced into the second step reactor 34 and is mixed with dilute aqueous heavy metal stream 37 such as is obtained from a rinsing step in a printed circuit production process. Effluent 38 which is acidic and contains heavy metals and ferrous ions is introduced into tank 40 together with a caustic alkaline reagent from conduit 42 to raise the pH in tank 40 to between about 7 and 12. Effluent slurry 44 is introduced into settling tank 20 to effect gravity separation of a ferrous hydroxide containing slurry 46, which can contain heavy metal hydroxides, from clarified liquid solution 48 which is directed as heavy metal-free liquid effluent 49 which is safe for disposal.

The following example illustrate the present invention and is not intended to limit the same.

EXAMPLE 1

This example serves to illustrate one method of using the process of this invention. The samples used are from the waste water treatment unit in a printed circuit board plant. A gravity settled metal hydroxide sludge having a pH of 10.7 and assayed at 25,400 mg/L of acid soluble iron (ferrous ion) and 2050 mg/L of acid soluble copper (cupric ion) is used. A spent acid copper electroplating bath sample with a pH of 0.1 and containing 34,500 mg/L of dissolved copper is used. A sample of raw chelated rinse water with a pH of 3.5 and containing 56 Mg/L of dissolved copper is used in the experiment.

One liter of a combined mixture of metal hydroxide sludge (875 mls) and spent acid copper plating bath (125 mls) is mixed for ninety minutes. Nearly all the solid material is dissolved, forming a solution with a pH of 1.5. Finely divided (−200 mesh) aluminum powder weighed at 3.5 grams is added to this rapidly mixing acidic copper and ferrous iron solution.

The appearance of metallic copper particles in almost immediate as the particles of aluminum react with the copper solution. The mixture is stirred for one hour, producing a slurry of copper colored particles that settle quickly when the mixing is stopped. A slightly brownish-green colored supernatent liquid is generated. About one liter of the ferrous solution is recovered, being decanted and saved for later use. The solids are kept in the bottom of the reaction beaker. The solids are triple rinsed with 100 mls of distsilled water each time, then poured out on a filter paper and air dried for 24 hours. The dry solids weigh 7.43 grams and assayed to contain 80.5% copper by weight.

The one liter of supernatent solution was analyzed for dissolved metals and found to contain 120 Mg/L copper, 3100 Mg/L aluminum, and 22,000 Mg/L iron. All of this solution is added to 10 gallons of chelated rinsewater that contains 56 mg/L dissolved copper and mixed for 10 minutes at a pH of 3.3. Subsequently, the pH of this solution is raised using sodium hydroxide solution (1.0 Normal NaOH) to a final adjusted pH of 11. Dark greenish to black colored solids precipitate and form a thin slurry. After mixing for 10 minutes, some anionic polymer is injected and mixed rapidly for 1 minute, then slowly mixed for another 2 minutes. A fast settling and well flocced body of solids is developed which settles quickly when the mixer is turned off. A very clean looking and clear aqueous solution is produced above the settled solids. An unfiltered sample of the clear treated rinsewater is analyzed by atomic absorption spectrophotometry and found to contain only 0.12 Mg/L of dissolved copper.

The hydroxide solids produced in the treatment of the 10 gallons of rinsewater are recovered and concentrated by gravity settling over a two day period. All the solids produced are thickened by gravity settling to occupy a volume of 840 mls, or slightly less than the volume of thick sludge put into the beginning of the experiment. Upon redissolving the solids with concentrated sulfuric acid, a solution is produced that assays for dissolved metals at 2600 Mg/L copper and 24,600 Mg/L iron and 400 Mg/L aluminum.

We claim:

1. The process for removing dissolved heavy metals from aqueous solutions containing said heavy metals which comprises (a) in a first reaction step, admixing and reacting a first aqueous acidic heavy metal containing solution with aluminum particles at a pH between about 0.1 and 4 to effect reduction and precipitation of said heavy metals from the first reaction solution, separating said reduced heavy metals from said first reaction solution to form a first acidic liquid effluent from said first reaction step, (b) in a second step, admixing said first acidic liquid effluent with a second aqueous acidic heavy metal containing solution at a pH between about 0.1 and 6 to produce a second acidic liquid effluent, (c) in a third reaction step, admixing and reacting said second acidic liquid effluent with a water soluble alkali composition at a pH between about 7 and 14 to produce a metal hydroxide slurry, separating said metal hydroxide slurry from the aqueous solution of the third reaction step to produce an alkaline, solids-free third liquid effluent and (d) recycling said metal hydroxide slurry to at least one of said first reaction step, said second step, or said third reaction step.

2. The process of claim 1 wherein the pH in the first reaction step is between about 0.5 and 3.

3. The process of claim 1 wherein the pH in the second reaction step is between about 1 and 5.

4. The process of claim 1 wherein the pH in the third reaction step is between about 8 and 12.

5. The process of claim 1 wherein said first aqueous acidic heavy metal containing solution contains dissolved heavy metals in a concentration between about 100 and 100,000 milligrams per liter.

6. The process of claim 1 wherein said first aqueous acidic heavy metal containing solution contains metal ions obtained by dissolving metal hydroxides in acid.

7. The process of claim 6 wherein said metal hydroxides contain heavy metal hydroxides.

8. The process of claim 6 wherein said metal hydroxides contain ferrous hydroxide.

9. The process of claim 6 wherein said metal hydroxides contain aluminum hydroxide.

10. The process of claim 1 wherein said first aqueous acidic heavy metal containing solution contains metal ions obtained by dissolving metal oxides in acid.

11. The process of claim 10 wherein said metal oxides contain ferric oxide.

12. The process of claim 1 wherein said first aqueous acidic heavy metal containing solution contains industrial metal plating waste.

13. The process of claim 1 wherein said first aqueous acidic heavy metal containing solution contains industrial metal etching waste.

14. The process of claim 1 wherein said first aqueous acidic heavy metal containing solution contains industrial ion exchange acidic regenerant liquid.

15. The process of claim 1 wherein said first aqueous acidic heavy metal containing solution contains metals extracted from ores.

16. The process of claim 1 wherein said heavy metal is a composition containing at least one metal selected from the group consisting of copper, tin, lead, cadmium, cobalt, mercury, chromium, zinc, manganese, silver, gold, platinum, palladium, vanadium, arsenic, antimony, bismuth, indium, rhodium, ruthenium, technetium, molybdenum, niobium, osmium, iridium, uranium, plutonium, a lanthanide and an actinide.

17. The process of claim 1 wherein said aluminum particles are of a size larger than +10 mesh.

18. The process of claim 1 wherein said aluminum particles are of a size smaller than +10 mesh.

19. The process of claim 1 wherein said aluminum particles are of a size smaller than +200 mesh.

20. The process of claim 1 wherein said second aqueous acidic heavy metal containing solution contains dissolved chelated or ammonia complexed heavy metal ions.

21. The process of claim 1 wherein said second aqueous acidic heavy metal containing solution contains dissolved heavy metals in a concentration between about 1 and 500 milligrams per liter.

22. The process of claim 1 wherein said second aqueous acidic heavy metal containing solution contains dissolved metals in a concentration between about 10 and 200 milligrams per liter.

23. The process of claim 1 wherein said second aqueous acidic heavy metal containing solution is contaminated groundwater.

24. The process of claim 1 wherein said second aqueous acidic heavy metal containing solution is landfill leachate water.

25. The process of claim 1 wherein said second aqueous acidic heavy metal containing solution is municipal sewerage.

26. The process of claim 1 wherein said second aqueous acidic heavy metal containing solution is mine shaft drainage water.

27. The process of claim 1 wherein said second aqueous acidic heavy metal containing solution is slag pile drainage water.

28. The process of claim 1 wherein said second aqueous acidic heavy metal containing solution is mine tailings pile drainage water.

29. The process of claim 1 wherein said first acidic liquid effluent contains dissolved ferrous ions.

30. The process of claim 1 wherein said first acidic liquid effluent contains dissolved aluminum ions.

31. The process of claim 1 wherein said metal hydroxide slurry of the third reaction step contains heavy metal hydroxides.

32. The process of claim 1 wherein said metal hydroxide slurry of the third reaction step contains ferrous hydroxide.

33. The process of claim 1 wherein said metal hydroxide slurry of the third reaction step contains aluminum hydroxide.

34. The process of claim 32 wherein said metal hydroxide slurry of the third reaction step is recycled to said first reaction step and is dissolved in acid.

35. The process of claim 1 which comprises admixing metallic iron particles with the first aqueous acidic heavy metal containing solution in the first reaction step, before or after adding aluminum particles.

36. The process of claim 32 which comprises admixing metallic iron particles with the first aqueous acidic heavy metal containing solution in the first reaction step, before or after adding aluminum particles.

37. The process of claim 34 which comprises admixing metallic iron particles with the first aqueous acidic heavy metal containing solution in the first reaction step, before or after adding aluminum particles.

38. The process of claim 1 which comprises adding ferrous sulfate to a liquid stream selected from the group consisting of said first aqueous acidic heavy metal containing solution, said first reaction solution, said first acidic liquid effluent, said second aqueous acidic heavy metal containing solution, said second acidic liquid effluent, or said metal hydroxide slurry.

39. The process of claim 32 which comprises adding ferrous sulfate to a liquid stream selected from the group consisting of said first aqueous acidic heavy metal containing solution, said first reaction solution, said first acidic liquid effluent, said second aqueous acidic heavy metal containing solution, said second acidic liquid effluent, or said metal hydroxide slurry.

40. The process of claim 34 which comprises adding ferrous sulfate to a liquid stream selected from the group consisting of said first aqueous acidic heavy metal containing solution, said first reaction solution, said first acidic liquid effluent, said second aqueous acidic heavy metal containing solution, said second acidic liquid effluent, or said metal hydroxide slurry.

41. The process of claim 1 which comprises adding a reducing agent selected from the group consisting of sulfur dioxide, sulfurous acid, metabisulfite, bisulfite ion, sulfite ion, dithionite ion, sodium borohydride, and mixtures thereof to a liquid stream selected from the group consisting of said first reaction solution, said first acidic liquid effluent, said second aqueous acidic heavy metal containing solution, said second acidic liquid effluent, or said metal hydroxide slurry.

42. The process of claim 16 which comprises adding a reducing agent selected from the group consisting of sulfur dioxide, sulfurous acid, metabisulfite, bisulfite ion, sulfite ion, dithionite ion, sodium borohydride, and mixtures thereof to a liquid stream selected from the group consisting of said first reaction solution, said first acidic liquid effluent, said second aqueous acidic heavy metal containing solution, said second acidic liquid effluent, or said metal hydroxide slurry.

43. The process of claim 32 which comprises adding a reducing agent selected from the group consisting of sulfur dioxide, sulfurous acid, metabisulfite, bisulfite ion, sulfite ion, dithionite ion, sodium borohydride, and mixtures thereof to a liquid stream selected from the group consisting of said first reaction solution, said first acidic liquid effluent, said second aqueous acidic heavy metal containing solution, said second acidic liquid effluent, or said metal hydroxide slurry.

44. The process of claim 34 which comprises adding a reducing agent selected from the group consisting of sulfur dioxide, sulfurous acid, metabisulfite, bisulfite ion, sulfite ion, dithionite ion, sodium borohydride, and mixtures thereof to a liquid stream selected from the group consisting of said first reaction solution, said first acidic liquid effluent, said second aqueous acidic heavy metal containing solution, said second acidic liquid effluent, or said metal hydroxide slurry.

45. The process of claim 37 which comprises adding a reducing agent selected from the group consisting of sulfur dioxide, sulfurous acid, metabisulfite, bisulfite ion, sulfite ion, dithionite ion, sodium borohydride, and mixtures thereof to a liquid stream selected from the group consisting of said first reaction solution, said first acidic liquid effluent, said second aqueous acidic heavy metal containing solution, said second acidic liquid effluent, or said metal hydroxide slurry.

46. The process of claim 38 which comprises adding a reducing agent selected from the group consisting of sulfur dioxide, sulfurous acid, metabisulfite, bisulfite ion, sulfite ion, dithionite ion, sodium borohydride, and mixtures thereof to a liquid stream selected from the group consisting of said first reaction solution, said first acidic liquid effluent, said second aqueous acidic heavy metal containing solution, said second acidic liquid effluent, or said metal hydroxide slurry.

47. The process of claim 39 which comprises adding a reducing agent selected from the group consisting of sulfur dioxide, sulfurous acid, metabisulfite, bisulfite ion, sulfite ion, dithionite ion, sodium borohydride, and mixtures thereof to a liquid stream selected from the group consisting of said first reaction solution, said first acidic liquid effluent, said second aqueous acidic heavy metal containing solution, said second acidic liquid effluent, or said metal hydroxide slurry.

48. The process of claim 40 which comprises adding a reducing agent selected from the group consisting of sulfur dioxide, sulfurous acid, metabisulfite, bisulfite ion, sulfite ion, dithionite ion, sodium borohydride, and mixtures thereof to a liquid stream selected from the group consisting of said first reaction solution, said first acidic liquid effluent, said second aqueous acidic heavy metal containing solution, said second acidic liquid effluent, or said metal hydroxide slurry.

* * * * *